(12) United States Patent
Elonsson (10) Patent No.: US 9,357,699 B2
(45) Date of Patent: Jun. 7, 2016

(54) ROBOTIC MOWER WITH SECURED SCREW-NUT INTERFACE FOR ADJUSTABLE CUTTING HEIGHT

(75) Inventor: Martin Elonsson, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/412,471

(22) PCT Filed: Jul. 4, 2012

(86) PCT No.: PCT/SE2012/050774
§ 371 (c)(1),
(2), (4) Date: Jan. 2, 2015

(87) PCT Pub. No.: WO2014/007696
PCT Pub. Date: Jan. 9, 2014

(65) Prior Publication Data
US 2015/0181805 A1  Jul. 2, 2015

(51) Int. Cl.
*A01D 34/74* (2006.01)
*F16H 25/24* (2006.01)
*A01D 34/00* (2006.01)

(52) U.S. Cl.
CPC .............. *A01D 34/74* (2013.01); *A01D 34/008* (2013.01); *F16H 25/24* (2013.01); *Y10T 74/18728* (2015.01)

(58) Field of Classification Search
USPC ............................................. 56/10.2 E, 17.1
See application file for complete search history.

(56) References Cited

U.S. PATENT DOCUMENTS

| 4,441,306 A | * | 4/1984 | Kuhn | ..................... A01D 34/74 |
| | | | | 56/15.9 |
| 5,175,939 A | | 1/1993 | Wolfram | |
| 5,203,151 A | | 4/1993 | Mills | |
| 589,691 A | | 9/1897 | Boyte et al. | |
| 1,739,697 A | | 12/1929 | Van Berkel | |
| 3,114,229 A | * | 12/1963 | Wilson | ................... A01D 34/74 |
| | | | | 192/45.1 |
| 3,918,239 A | | 11/1975 | Aldred et al. | |
| 3,977,163 A | | 8/1976 | Olin et al. | |

(Continued)

FOREIGN PATENT DOCUMENTS

| CN | 201491509 U | 6/2010 |
| CN | 201557392 U | 8/2010 |

(Continued)

OTHER PUBLICATIONS

International Search Report and Written Opinion of PCT/SE2012/050774 mailed Feb. 13, 2013.

(Continued)

*Primary Examiner* — Alicia Torres
(74) *Attorney, Agent, or Firm* — Nelson Mullins Riley & Scarborough LLP (57) ABSTRACT

A robotic mower includes a chassis, a cutting motor driving at least one cutting blade, and a height adjustment assembly. The cutting motor is mounted on a motor bracket. The motor bracket provides structural support for the cutting motor at an adjustable level relative to the chassis. The height adjustment assembly includes a biasing element, a screw engagement nut, and a height adjustment screw. The screw engagement nut is operably coupled to the motor bracket to enable adjustment of a height of the motor bracket via rotation of the height adjustment screw. The height adjustment screw rotates to translate the screw engagement nut vertically along the height adjustment screw based on an engagement of teeth on the screw engagement nut with threads of the height adjustment screw. The teeth of the screw engagement nut are urged toward the threads of the height adjustment screw via the biasing element.

20 Claims, 9 Drawing Sheets

(56) References Cited

U.S. PATENT DOCUMENTS

| | | | |
|---|---|---|---|
| 5,351,467 | A | 10/1994 | Trefz et al. |
| 5,507,137 | A | 4/1996 | Norris |
| 6,651,415 | B2 | 11/2003 | Burke |
| 7,117,660 | B1 | 10/2006 | Colens |
| 2009/0183482 | A1* | 7/2009 | Cheung .................. A01D 34/68 56/17.1 |
| 2009/0211216 | A1 | 8/2009 | Keski-Luopa |
| 2011/0302893 | A1 | 12/2011 | Park |
| 2012/0023880 | A1 | 2/2012 | Messina et al. |
| 2012/0023887 | A1 | 2/2012 | Messina et al. |
| 2012/0222395 | A1* | 9/2012 | Grewe .................. A01D 34/74 56/17.2 |

FOREIGN PATENT DOCUMENTS

| | | | | |
|---|---|---|---|---|
| CN | 201742727 | U | 2/2011 | |
| CN | WO 2011026419 | A1 * | 3/2011 | ............. A01D 34/74 |
| CN | 201830660 | | 5/2011 | |
| DE | 3411354 | A1 | 1/1986 | |
| GB | 1010481 | A | 11/1965 | |
| WO | 9839581 | A1 | 9/1998 | |
| WO | 2007085820 | A1 | 8/2007 | |

OTHER PUBLICATIONS

Chapter I International Preliminary Report on Patentability of PCT/SE2012/050774 mailed Jan. 6, 2015.

* cited by examiner

ROBOTIC MOWER WITH SECURED SCREW-NUT INTERFACE FOR ADJUSTABLE CUTTING HEIGHT

TECHNICAL FIELD

Example embodiments generally relate to robotic mowers and, more particularly, relate to a robotic mower that has an adjustable cutting height.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. More recently, robotic mowers and/or remote controlled mowers have also become options for consumers to consider.

Lawn mowers are typically capable of transiting over even and uneven terrain to execute yard maintenance activities relating to mowing. However, most lawn mowers are repeatedly exposed to the same operating environments over the course of their lifetimes. For example, a lawn mower may operate to cut a single yard over its entire life, or may operate to cut a relatively fixed series of yards or parcels if it is used for commercial purposes. Given that computing devices are becoming more ubiquitous, it is to be expected that they may be employed to assist in operation of lawn mowers. As such, many additional functionalities may be provided or supported by the employment of computing devices on lawn mowers.

As one example, automated cutting height adjustment may be accomplished with the help of computer controlled components. However, even when such adjustment is performed manually, it is possible that materials used may create interfaces for which gap size, friction and other factors become important considerations relative to the performance of the height adjustment.

BRIEF SUMMARY OF SOME EXAMPLES

Some example embodiments may therefore provide a robotic device having a secured screw-nut interface to assist in maintaining a tight fit and a relatively constant amount of friction between height adjustment components that support an adjustable cutting height for the robotic device. In some cases, control circuitry that can be used in connection with the secured screw-nut interface of an example embodiment. However, manual adjustments are also assisted with the use of example embodiments.

According to one example embodiment, a robotic mower is provided. The robotic mower may include a chassis, a cutting motor driving at least one cutting blade, and a height adjustment assembly. The cutting motor may be mounted on a motor bracket. The motor bracket may provide structural support for the cutting motor at an adjustable level relative to the chassis. The height adjustment assembly may include a biasing element, a screw engagement nut, and a height adjustment screw. The screw engagement nut may be operably coupled to the motor bracket to enable adjustment of a height of the motor bracket via rotation of the height adjustment screw. The height adjustment screw may rotate to translate the screw engagement nut vertically along the height adjustment screw based on an engagement of teeth on the screw engagement nut with threads of the height adjustment screw. The teeth of the screw engagement nut may be urged toward the threads of the height adjustment screw via the biasing element.

According to another example embodiment, a height adjustment assembly for a robotic mower is provided. The robotic mower may include a chassis and a cutting motor driving at least one cutting blade. The cutting motor may be mounted on a motor bracket. The motor bracket may provide structural support for the cutting motor at an adjustable level relative to the chassis. The height adjustment assembly may include a biasing element, a screw engagement nut, and a height adjustment screw. The screw engagement nut may be operably coupled to the motor bracket to enable adjustment of a height of the motor bracket via rotation of the height adjustment screw. The height adjustment screw may rotate to translate the screw engagement nut vertically along the height adjustment screw based on an engagement of teeth on the screw engagement nut with threads of the height adjustment screw. The teeth of the screw engagement nut may be urged toward the threads of the height adjustment screw via the biasing element.

Some example embodiments may improve the ability of operators to control the cutting height of an autonomous mowing device.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 1:
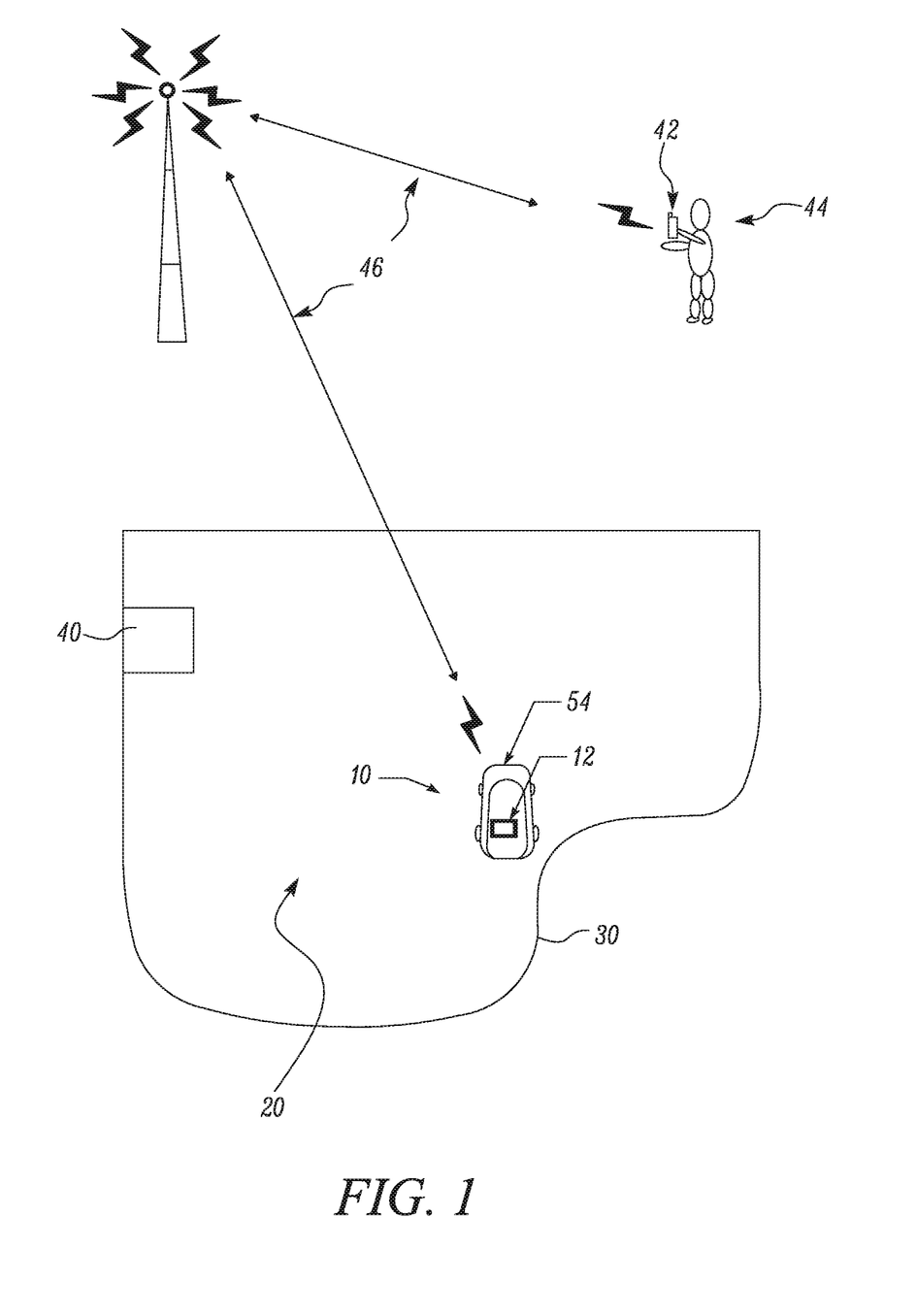
FIG. 1 illustrates an example operating environment for a robotic mower.

Robotic vehicles such as robotic mowers, robotic watering devices, and/or the like, typically operate in an area that is defined by any boundary that can be technically or physically defined. In one example, a technical means by which to define such a boundary may include a guide wire that bounds the area to be mowed. The robotic vehicle then roams within the bounded area to ensure that the entire area is mowed, watered, etc., but the robotic vehicle does not go outside of the bounded area. FIG. 1 illustrates an example operating environment for a robotic mower 10 that may employ a system bounded by such a guide wire. The robotic mower 10 may operate to cut grass on a parcel 20 (i.e., a land lot), the boundaries of which may be defined using one or more physical boundaries (e.g., a fence, wall, curb and/or the like), a guide wire 30 or combinations thereof. The guide wire 30 may emit electrical signals that are detectable by the robotic mower 10 to inform the robotic mower 10 when a boundary of the parcel 20 has been reached. The robotic mower 10 may be controlled, at least in part, via control circuitry 12 located onboard. The control circuitry 12 may include, among other things, the ability to detect the guide wire 30 to redirect the robotic mower 10 to other areas within the parcel 20.

In an example embodiment, the robotic mower 10 may be battery powered via one or more rechargeable batteries. Accordingly, the robotic mower 10 may be configured to return to a charge station 40 that may be located at some position on the parcel 20 in order to recharge the batteries. The batteries may power a drive system and a blade control system of the robotic mower 10. However, the control circuitry 12 of the robotic mower 10 may selectively control the application of power or other control signals to the drive system and/or the blade control system to direct the operation of the drive system and/or blade control system. Accordingly, movement of the robotic mower 10 over the parcel 20 may be controlled by the control circuitry in a manner that enables the robotic mower 10 to systematically traverse the parcel 20 while operating a cutting blade to cut the grass on the work area of the parcel 20.

In some embodiments, the operator of the robotic mower 10 may be configured to communicate wirelessly with an electronic device 42 (e.g., a computer, mobile telephone, PDA, smart phone, and/or the like) of a remote operator 44 via a wireless communication network 46. However, the wireless network 46 and other remote devices may not be employed in some embodiments. If employed, the wireless network 46 may be a data network, such as a local area network (LAN), a metropolitan area network (MAN), a wide area network (WAN) (e.g., the Internet), and/or the like, which may couple the robotic mower 10 to devices such as processing elements (e.g., personal computers, server computers or the like) or databases. Communication between the wireless network 46 and the devices or databases (e.g., servers, electronic device 42, control circuitry 12, etc.) may be accomplished by either wireline or wireless communication mechanisms and corresponding protocols.

Figure 2A:
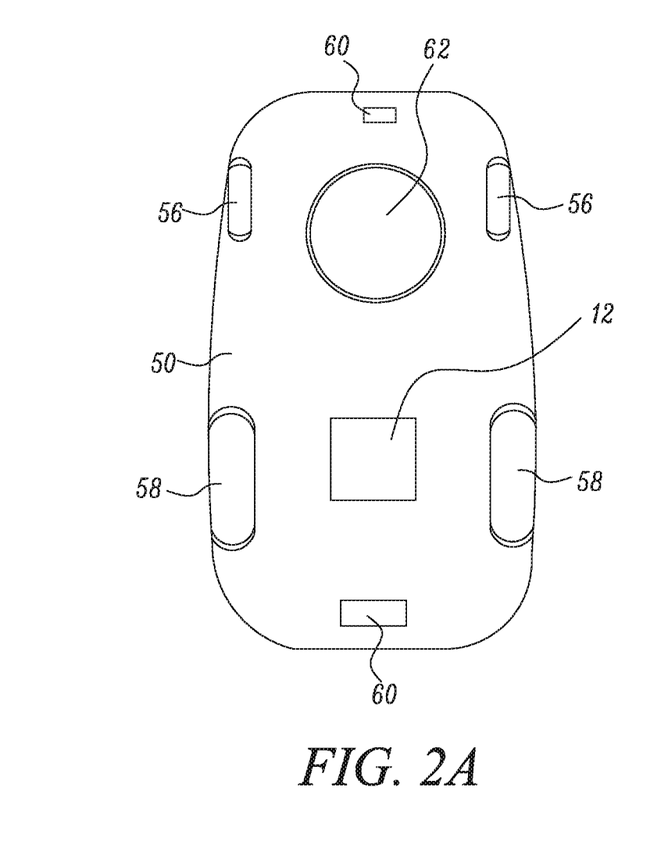
FIG. 2A illustrates a schematic view of a lower chassis and various components of the robotic mower according to an example embodiment.
Figure 2B:
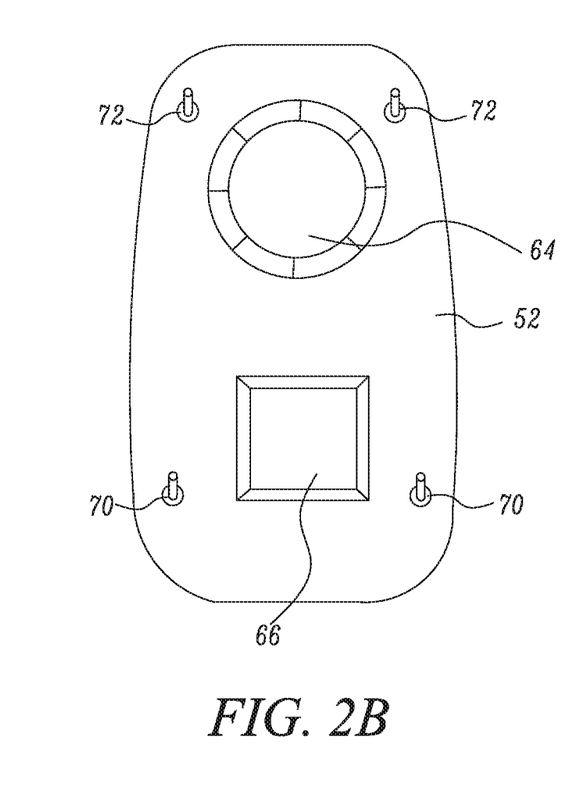
FIG. 2B illustrates a schematic view of an upper chassis and various other components of the robotic mower according to an example embodiment.

FIG. 2, which includes FIGS. 2A and 2B, illustrates some of the parts that may be employed in connection with an example of the robotic mower 10. However, it should be appreciated that example embodiments may be employed on numerous other vehicles that may employ different designs. FIG. 2A illustrates a schematic view of a lower chassis and various components of the robotic mower according to an example embodiment and FIG. 2B illustrates a schematic view of an upper chassis and various other components of the robotic mower according to an example embodiment.

Referring to FIGS. 1 and 2, the robotic mower 10 may include a lower chassis 50, an upper chassis 52 and a body 54. The upper chassis 52 may be configured to be arranged on top of the lower chassis 50 and the body 54 may be configured to be arranged on top of the upper chassis 52. The lower chassis 50 may form a support structure from which one or more front wheels 56 and one or more rear wheels 58 may be supported. In some embodiments, the one or more rear wheels 58 may be relatively large as compared to the one or more front wheels 56. Moreover, the one or more rear wheels 58 may be configured to operate either in a forward or backward direction. In some embodiments, the front wheels 56 may be pivoting wheels.

In an example embodiment, the lower chassis 50 may further include one or more sensors 60 that may be used to detect the guide wire 20 and/or objects that may form part of the boundary of the parcel. The sensors 60 may also detect objects that may be encountered during operation of the robotic mower 10 within the boundaries of the parcel 20. These objects may be fixed or temporary (e.g., movable) objects. In some cases, the sensors 60 may include a front sensor and a rear sensor. However, it should be appreciated that any number of sensors may be employed and they may be disposed at any desirable location on the robotic mower 10. The sensors 60 may include sensors related to positional determination (e.g., a GPS receiver, an accelerometer, a camera, a radar transmitter/detector, an ultrasonic sensor, a laser scanner and/or the like). Thus, for example, positional determinations may be made using GPS, inertial navigation, optical flow, radio navigation, visual location (e.g., VSLAM) and/or other positioning techniques or combinations thereof. Accordingly, the sensors 60 may be used, at least in part, for determining the location of the robotic mower 10 relative to boundaries or other points of interest (e.g., a starting point, the guide wire or other key features) of the parcel 20, or determining a position history or track of the robotic mower 10 over time.

The lower chassis 50 may further support a cutting motor 62 configured to drive a cutting blade or other cutters of the robotic mower 10. In some embodiments, the body 54 and the upper chassis 52 may be plastic, light metal, or other similarly lightweight components. The upper chassis 52 and/or the body 54 may support a user interface (e.g., display 66). The display 66 may be employed to interface with the control circuitry 12 for controlling operations of the robotic mower 10.

In some embodiments, the sensors 60 may include sensors specifically provided for detecting objects (other than the guide wire 20 or objects forming boundaries of the parcel 20) and/or sensors for detecting lifting (or tipping beyond a threshold amount) of the robotic mower 10. Alternatively, separate sensors (e.g., collision sensors 70 and lifting sensors 72) may be provided for each function, and those sensors may be capable of communicating with the control circuitry 12 in addition to the sensors 60. In an example embodiment, the sensors 60 may include a camera, which may be used to optically determine the existence of objects in view of the camera and, in some embodiments, may be configured to determine or distinguish an identity of the object (e.g., to determine if an object is a reference object).

In some embodiments, the cutting height at which the robotic mower 10 operates may be adjustable. In some cases, adjustment of the cutting height may be accomplished by adjusting the height of the blade or blades that perform the cutting operation. One mechanism for adjusting blade height could include an apparent lengthening or shortening of the shaft to which the blade or blades are mounted. However, in practice, this may be difficult to accomplish. Thus, some embodiments may instead employ a fixed length for the shaft and enable adjustment of the vertical position of the cutting motor 62, the shaft and the cutting blade or blades relative to a fixed part of the chassis of the robotic mower 10. In other words, the entirety of the cutting system may be linearly adjustable in a substantially vertical direction by mounting the cutting system on a linear bearing assembly. The linear bearing assembly may then support adjustment of the height of the cutting system via operation of a cutting height adjustment motor that may be controlled at least in part via the control circuitry 12 or by manual interaction with a height adjuster.

Figure 3:
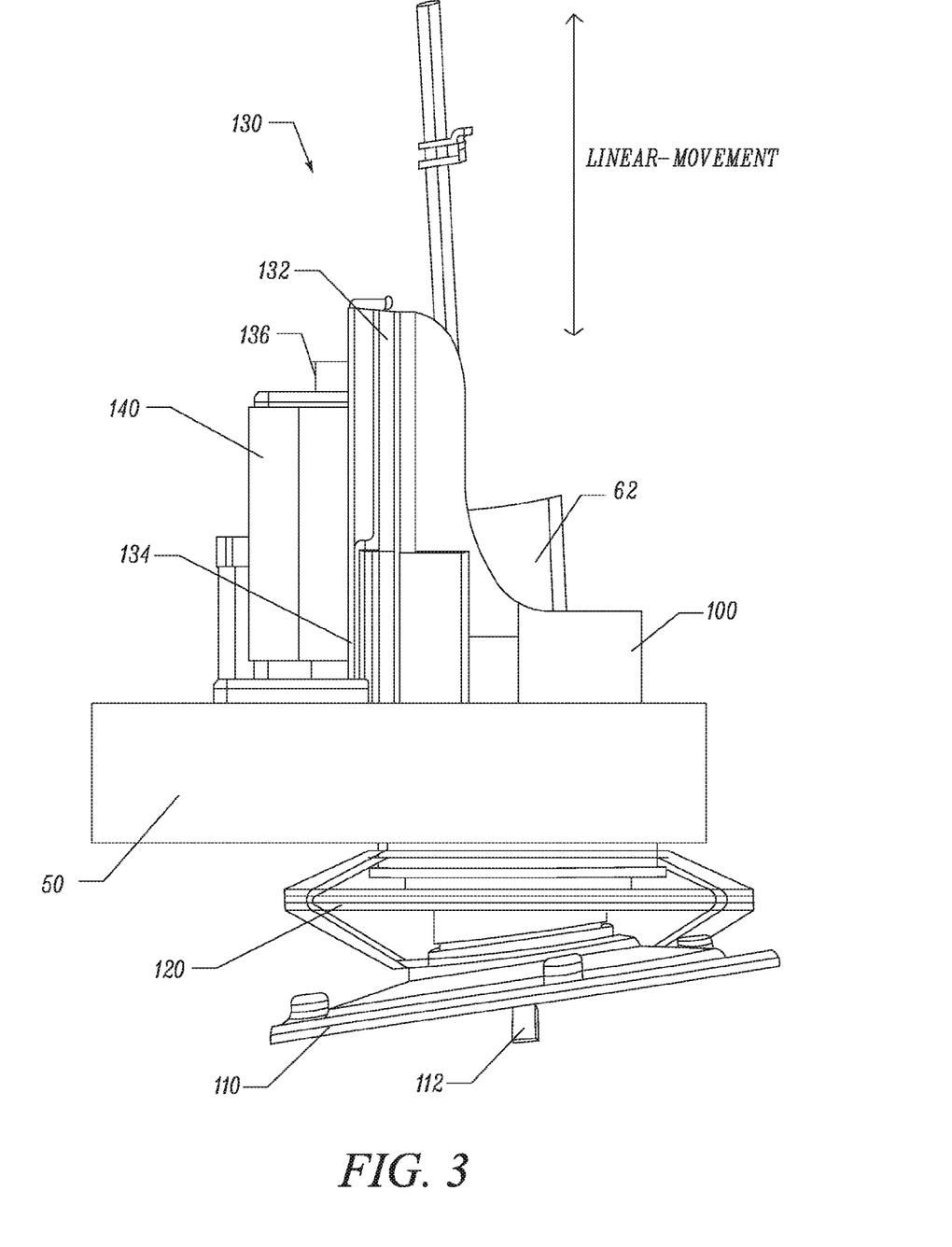
FIG. 3 illustrates a side view of a portion of a robotic mower employing such a linear bearing assembly according to an example embodiment.

FIG. 3 illustrates a side view of a portion of a robotic mower employing such a linear bearing assembly according to an example embodiment. In this regard, for example, FIG. 3 illustrates the lower chassis 50 forming a fixed part of the chassis of the robotic mower 10. The lower chassis 50 supports a motor bowl 100 (e.g., motor bracket, motor mount, or motor fixing) that supports the cutting motor 62. In this regard, the motor bowl 100 of an example embodiment provides structural support for the cutting motor 62 at an adjustable elevation or height relative to the ground beneath the robotic mower 10. A cutting disc 110 is disposed at the end of a shaft 112 that is turned by the cutting motor 62 and extends linearly therefrom in a direction toward an underside of the robotic mower 10. In some embodiments, a bellows 120 may be disposed between the cutting disc 110 and the lower chassis 50 to prevent moisture and/or debris from fouling the cutting motor 62 or other internal components of the robotic mower 10.

The motor bowl 100 may be operably coupled to a height adjustment assembly 130 to provide for the adjustable elevation characteristic of the motor bowl 100. The height adjustment assembly 130 may include components that enable the motor bowl 100 to be elevated or lowered relative to the lower chassis 50 within a predefined range in order to control the cutting height of the robotic mower 10. As such, the motor bowl 100 provides a structure to support the cutting motor 62 at an adjustable level relative to the ground and the chassis (e.g., lower chassis 50) of the robotic mower 10. In an example embodiment, the height adjustment assembly 130 may include linear bearings 132 with which a portion of the motor bowl 100 is slideably engaged. For example, the motor bowl 100 may have a rack assembly 134 attached thereto in order to enable the rack assembly 134 to ride within grooves of a height adjustment screw 136 (or worm gear). In some cases, the rack assembly 134 may be fixed to the motor bowl 100, but may ride in the linear bearings 132 to enable a height adjustment to be accomplished via raising or lowering of the rack assembly 134 responsive to turning of the height adjustment screw 136. In an example embodiment, a height adjustment motor 140 may be provided to turn the height adjustment screw 136. The height adjustment motor 140 may be an electric motor that may receive control inputs at least in part via the control circuitry 12 and may be powered via the on-board power system of the robotic mower 10 (e.g., batteries).

During operation, the control circuitry 12 may provide a signal to the height adjustment motor 140 to adjust the height of the cutting disc 110. The height adjustment motor 140 may operate accordingly to turn the height adjustment screw 136. Turning of the height adjustment screw 136 may cause threads on the height adjustment screw 136 to be passed through slots between teeth of the rack assembly 134. Dependent upon the direction of rotation of the height adjustment screw 136, the rack assembly 134 may receive a lifting force or lowering force and the motor bowl 100 may slide within the linear bearings 132 in a corresponding direction to adjust the height of the cutting disc 110 and thereby also adjust the height of the grass that is cut by the robotic mower 10.

In some cases, rather than adjusting blade height and then operating the robotic mower 10 to observe the cutting height to make cutting height adjustments based on lowering or raising the cutting height from the observed level, it may be desirable to simply define a specific cutting height and have the robotic mower 10 adjust its cutting disc 110 to the corresponding desired height. To make such an adjustment, an input may be provided to the control circuitry 12 and the control circuitry 12 may direct movement of the height adjustment motor 140 to achieve a desired cutting height based on predefined information correlating a desired cutting height to a determinable position of some components of the robotic mower 10. For example, a two inch cutting height may be correlated to a certain motor bowl 100 height. Thus, some example embodiments may provide structural components and corresponding methods of employing those components in order to determine a motor bowl 100 height and further to associate a given motor bowl 100 height with a cutting height. However, since the robotic mower 10 operates in relatively harsh conditions, it is possible that component slippage, electrical fluctuations, or other irregularities may be encountered that could impact the accuracy of such readings. Accordingly, some embodiments may further employ a secured screw-nut interface to enable the robotic mower 10 to maintain a relatively consistent friction between the rack assembly 134 (e.g., the nut) and the height adjustment screw 136 so that slippage between these components is less likely.

Figure 4:
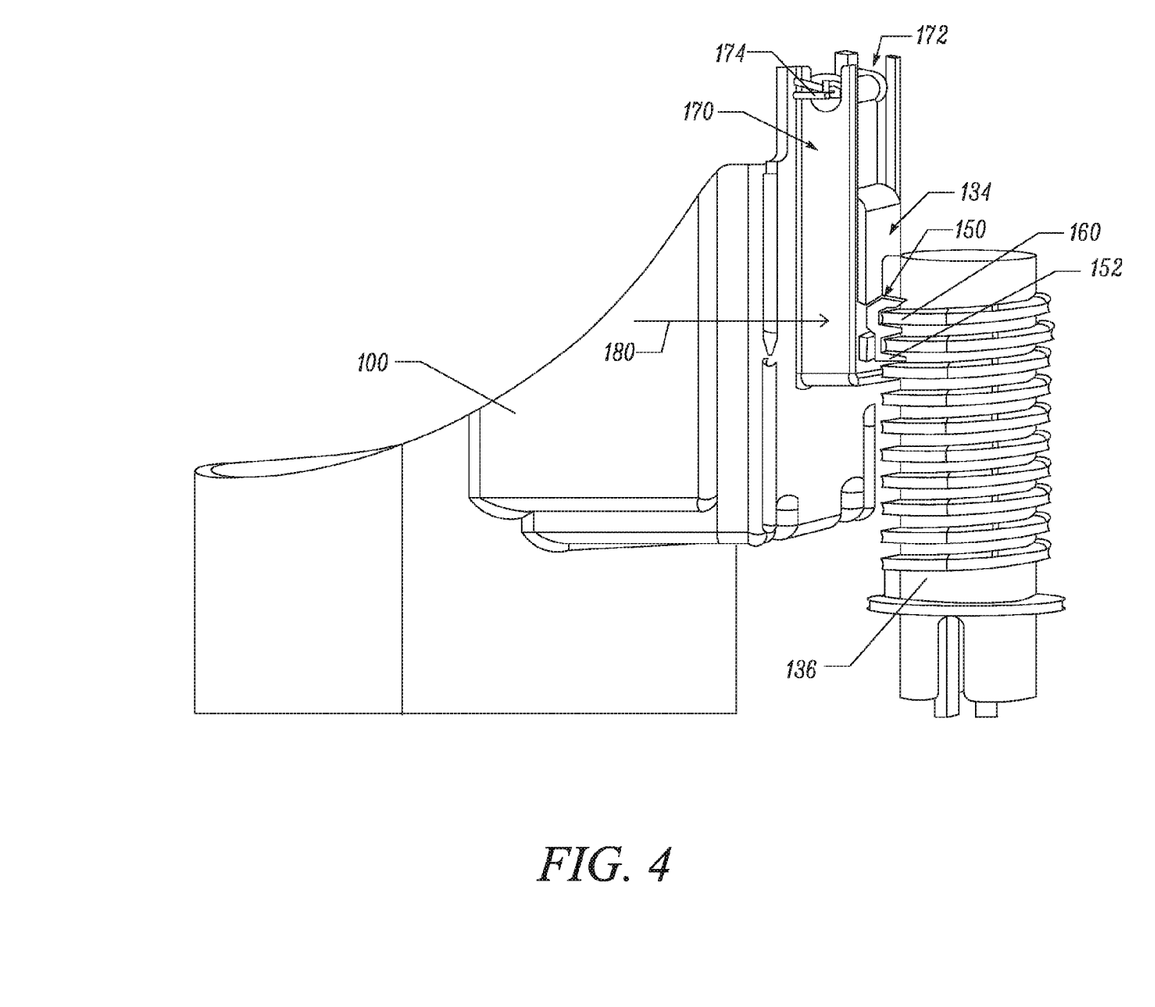
FIG. 4 illustrates a perspective view of some components of a secured screw-nut interface for use in connection with cutting height adjustment according to an example embodiment.
Figure 5:
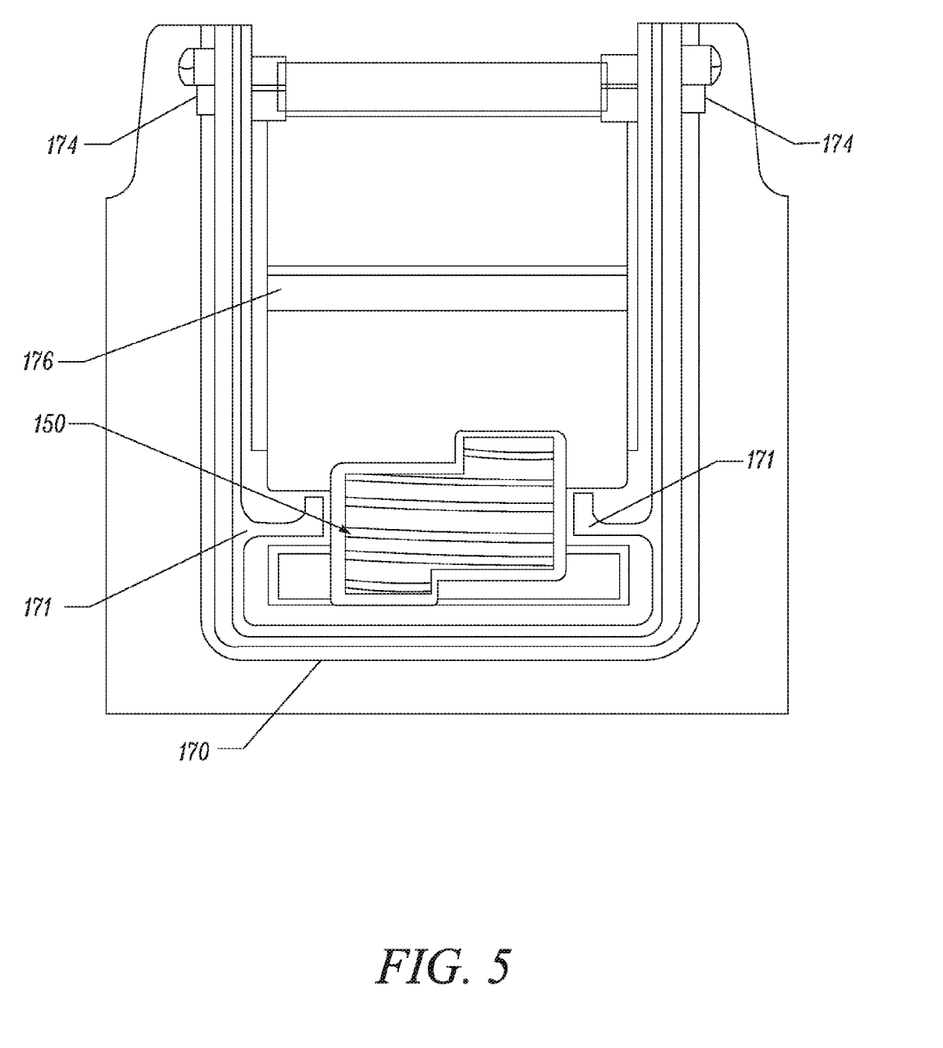
FIG. 5 illustrates a front view of a screw engagement nut of the secured screw-nut interface according to an example embodiment.
Figure 6:
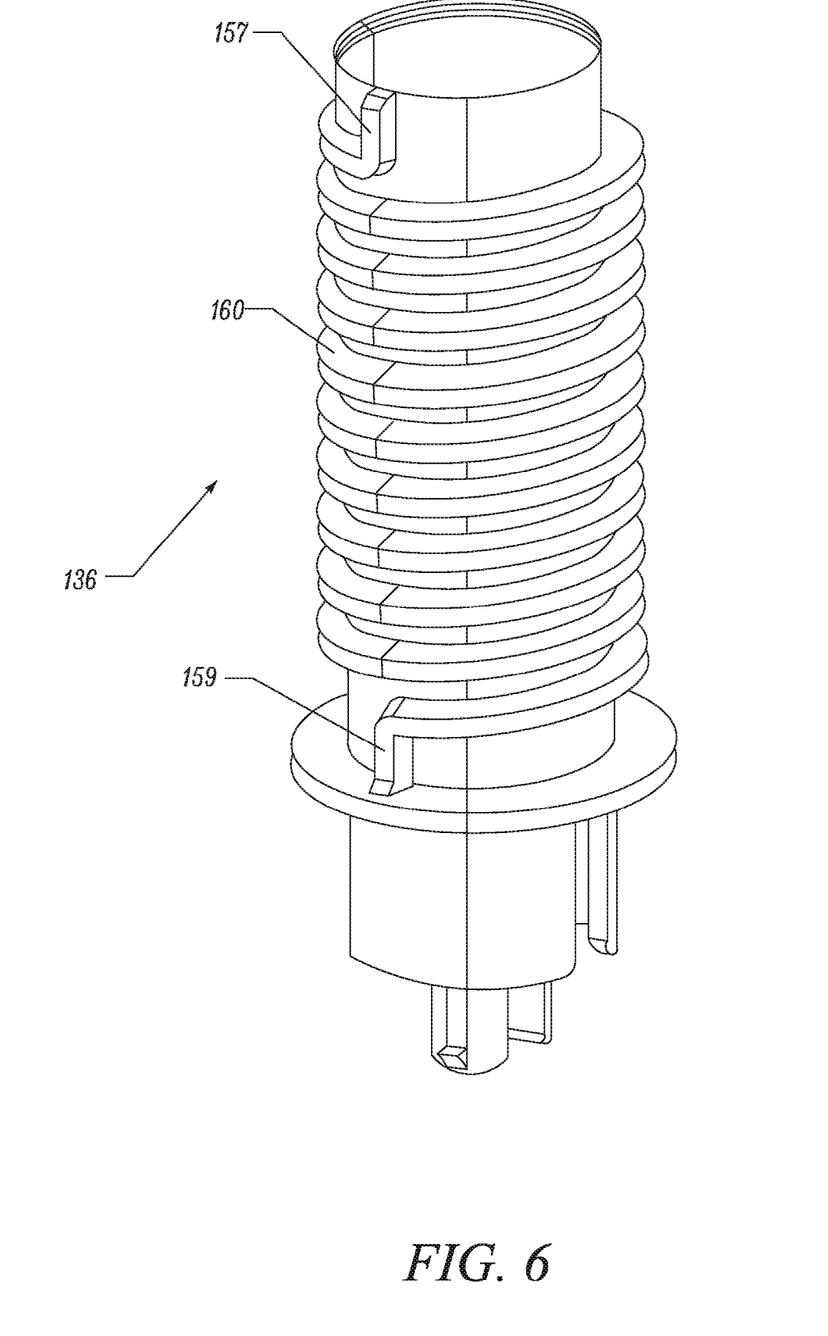
FIG. 6 illustrates an isolated side view of the height adjustment screw to show the threads that extend to the ends of the operating range thereof, and to show stops that define the end of the operating range according to an example embodiment.
Figure 7:
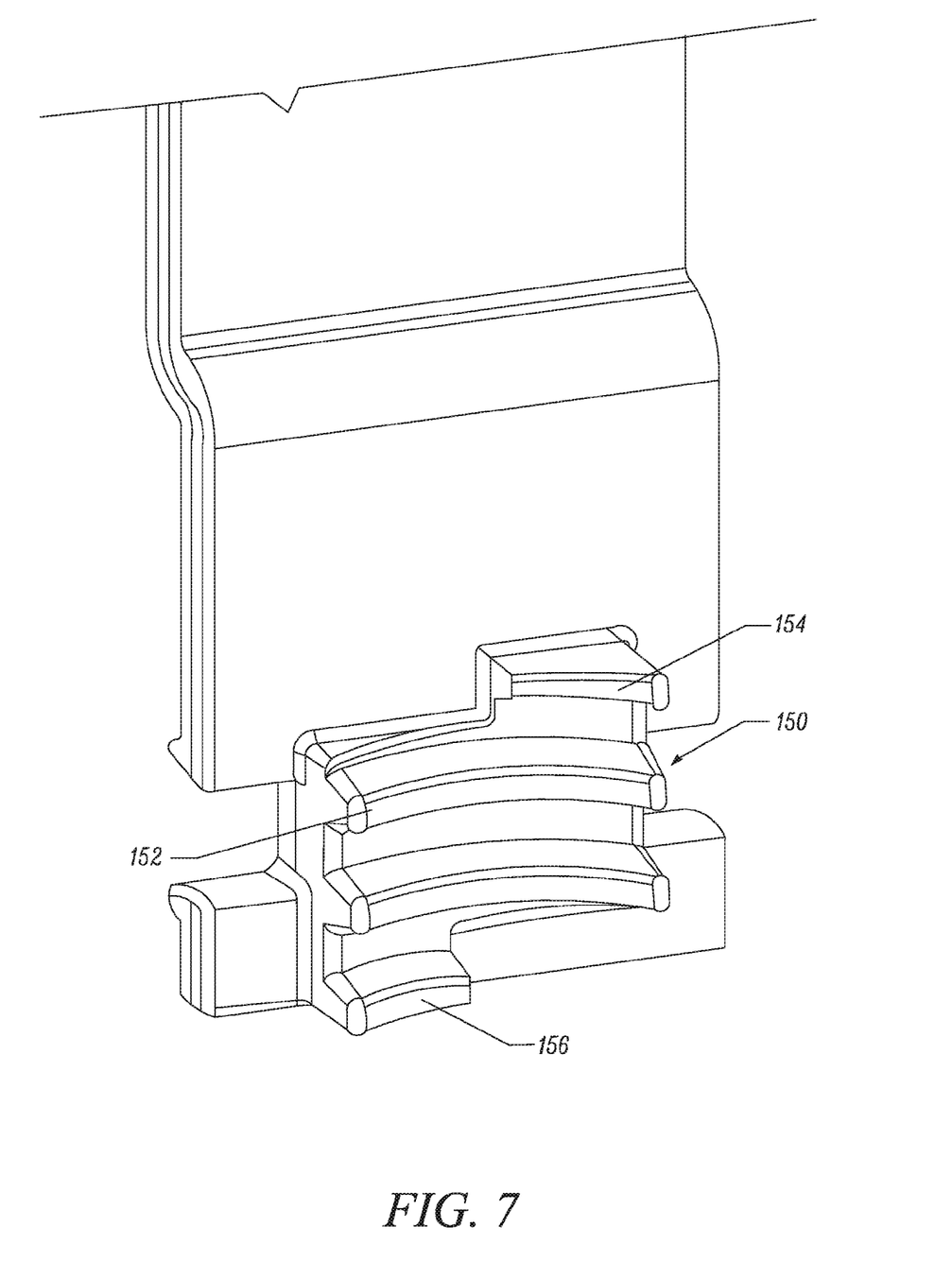
FIG. 7 illustrates an isolated front view of the screw engagement nut to show the teeth disposed thereon according to an example embodiment.
Figure 8:
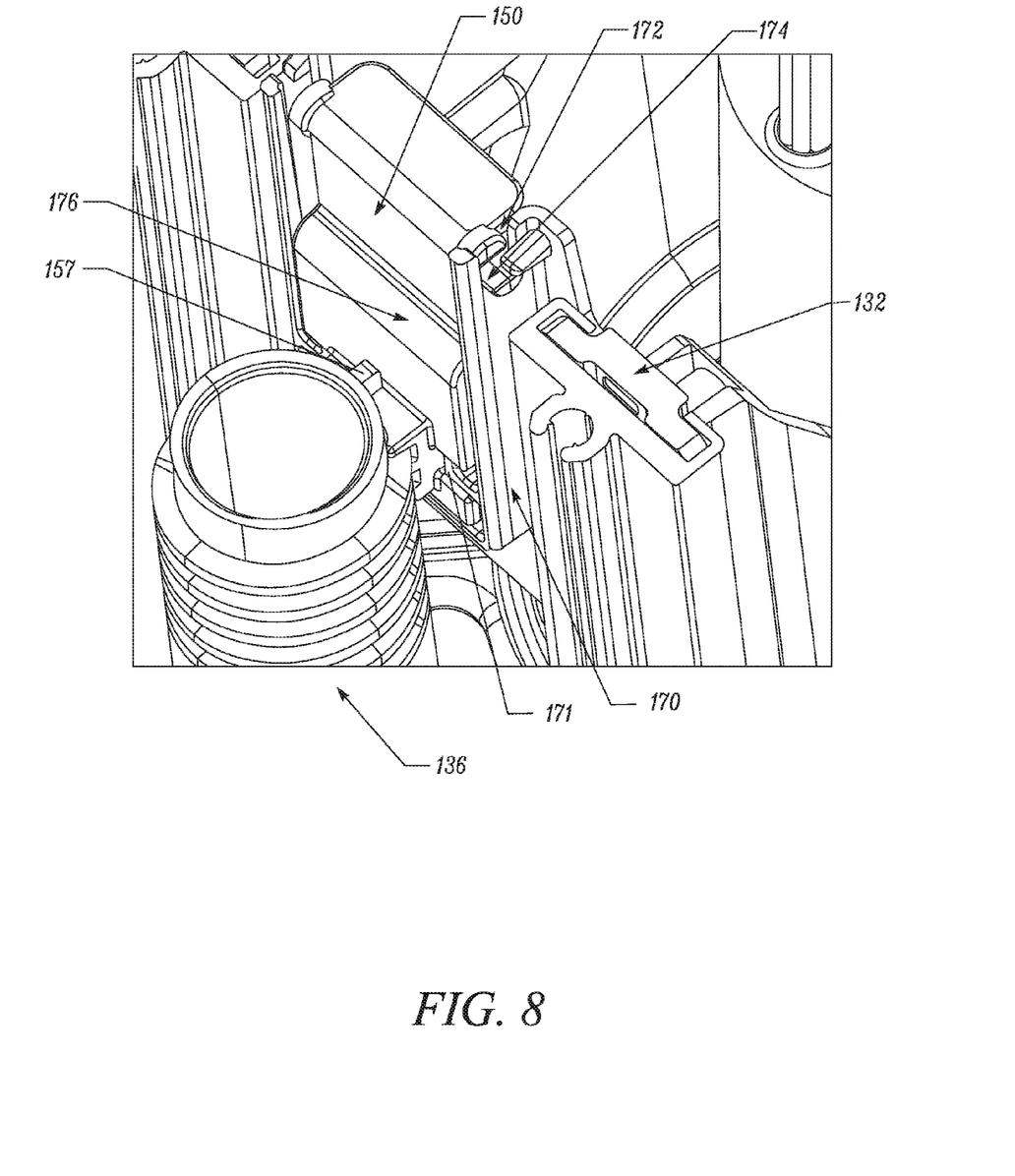
FIG. 8 illustrates a perspective view of some components of the secured screw-nut interface according to an example embodiment.
Figure 9:
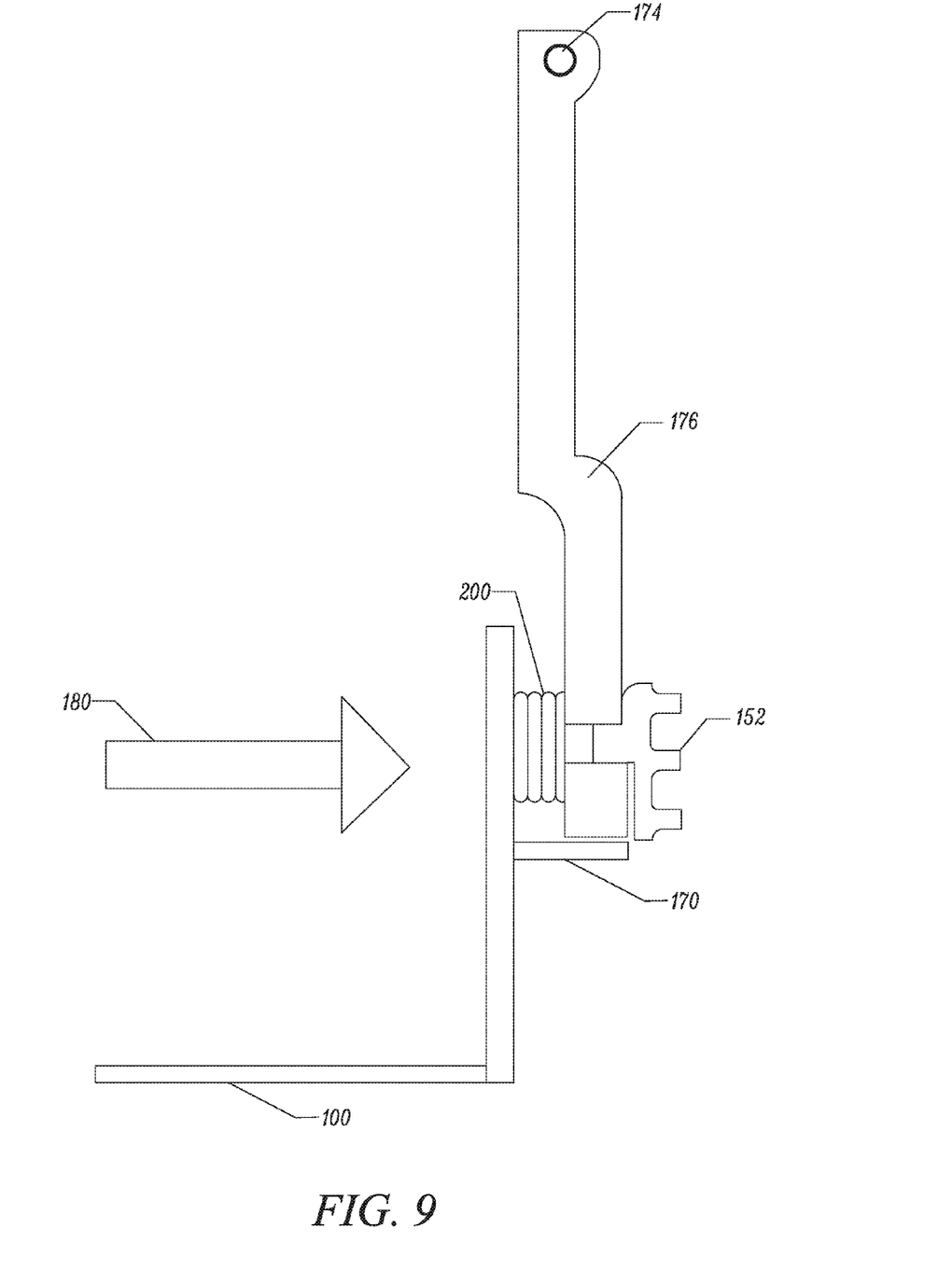
FIG. 9 illustrates a cross section view of the secured screw-nut interface taken along a longitudinal centerline thereof according to an example embodiment.

FIG. 4 illustrates a perspective view of some components of a secured screw-nut interface for use in connection with cutting height adjustment according to an example embodiment. FIG. 5 illustrates a front view of a screw engagement nut of the secured screw-nut interface according to an example embodiment. FIG. 6 illustrates an isolated side view of the height adjustment screw to show the threads that extend to the ends of the operating range thereof, and to show stops that define the end of the operating range according to an example embodiment. FIG. 7 illustrates an isolated front view of the screw engagement nut to show the teeth disposed thereon according to an example embodiment. FIG. 8 illustrates a perspective view of some components of the secured screw-nut interface according to an example embodiment and FIG. 9 illustrates a cross section view of the secured screw-nut interface taken along a longitudinal centerline thereof according to an example embodiment. FIGS. 4-9 are depicted such that many surrounding components are removed in order to give a clearer view of the secured screw-nut interface. However, it should be appreciated that the secured screw-nut interface may include, be surrounded by or interact with other components that are not shown in FIGS. 4-9. An example embodiment will now be described in reference to FIGS. 4-9.

FIG. 4 shows the rack assembly 134 of FIG. 3 in greater detail and illustrates a screw engagement nut 150 that includes multiple teeth 152 that are configured to engage threads 160 of the height adjustment screw 136. The teeth 152 may be spaced apart and sized to ride within the threads 160 such that turning of the height adjustment screw 136 causes the screw engagement nut 150 to be translated along the height adjustment screw 136 accordingly and to thereby adjust the height of the motor bowl 100, which is supported vertically via the linear bearings 132 at a height that is determined by the position of the screw engagement nut 150 relative to the height adjustment screw 136.

The height adjustment screw 136 is arranged such that an axis of the height adjustment screw 136 is substantially parallel to the direction of linear movement of the motor bowl 100 when height adjustments are made. Thus, the height adjustment screw 136 itself does not move vertically. Instead, the height adjustment screw 136 rotates about its axis but maintains a constant vertical orientation. To cause the rotation of the height adjustment screw 136, motion may be transferred from rotation of a shaft of the height adjustment motor 140 to the height adjustment screw 136. Alternatively, the operator may manually turn the height adjustment screw 136 in the desired direction to cause lowering or raising of the cutting height.

In an example embodiment, the teeth 152 of the screw engagement nut 150 may include a top partial tooth 154 on a top part of the screw engagement nut 150 and a bottom partial tooth 156 on a bottom part of the screw engagement nut 150. Meanwhile, the height adjustment screw 136 may include a top stop 157 and a bottom stop 159. The top and bottom stops 157 and 159 may be configured to extend substantially vertically to provide a surface for stopping upward or downward motion of the screw engagement nut 150 along the height adjustment screw at top and bottom limits, respectively, to the range of motion of the screw engagement nut 150. Accordingly, for example, when the top partial tooth 154 hits the top stop 157 (as shown in FIG. 8) responsive to turning of the height adjustment screw 136 so that the screw engagement nut 150 is translated up the height adjustment screw 136, the upward motion of the screw engagement nut 150 stops.

In some cases, it may be desirable to maintain tolerances between the height adjustment screw 136 and the screw engagement nut 150 relatively constant over time. In this regard, for example, if the fit between the height adjustment screw 136 and the screw engagement nut 150 changes over time, the operation of the height adjustment components of the robotic mower 10 may be compromised. For example, if tolerances are increased over time, it may be possible for the teeth 152 of the screw engagement nut 150 to slip relative to the threads 160. Accurate height determinations may therefore be compromised or even unexpected cutting height changes could occur during operation if the motor bowl 100 slips to a lower elevation. On the other hand, if tolerances are not maintained, it may be possible for the surfaces that engage each other on the height adjustment screw 136 and the screw engagement nut 150 to become worn so that friction between the height adjustment screw 136 and the screw engagement nut 150 may increase. This may cause difficulty in making height adjustments and further friction or even damage to the surfaces that may ultimately render height adjustment impossible.

To avoid or at least vastly decrease the likelihood of the above described negative impacts occurring, some embodiments may provide a secured screw-nut interface that maintains a relatively tight and constant force application to the interface between the height adjustment screw 136 and the screw engagement nut 150. For example, some embodiments may employ an elastic element to provide a relatively constant friction and tight fit between the height adjustment screw 136 and the screw engagement nut 150. In this regard, for example, the elastic element may be provided to push the screw engagement nut 150 toward the height adjustment screw 136.

In an example embodiment, the screw engagement nut 150 may be housed at least partially within a nut housing 170 that is fixedly attached to a portion of the motor bowl 100 (or to another structure that is attached to the motor bowl 100). In an example embodiment, the nut housing 170 may include three substantially rectangular shaped sidewalls that extend away from the motor bowl 100 toward the height adjustment screw 136. The nut housing 170 may substantially surround the sides of the screw engagement nut 150 and one embodiment may further employ ribs 171 extending inwardly toward to teeth 152 of the screw engagement nut 150 in one example). However, the nut housing 170 may be opened at the top and at the front. In one example embodiment, the top of the nut housing 170 may be opened and include a pivot point 172 for enabling an axle 174 of the screw engagement nut 150 to be rotatably attached to the nut housing 170. The screw engagement nut 150 may therefore be rotatably suspended from its axle 174 at the pivot point 172 such that the screw engagement nut 150 sits within the nut housing 170 and faces the height adjustment screw 136 out of the open front of the nut housing 170.

The axle 174 may be suspended at the pivot point 172 so that the screw engagement nut 150 is not necessarily rigidly fixed to the motor bowl 100. Instead, the screw engagement nut 150 may be rotatably suspended at the pivot point 172 so that leverage or externally applied forces may be used to influence or urge the screw engagement nut 150 toward the height adjustment screw 136. As such, although the screw engagement nut 150 is shown, for example, in FIGS. 4, 5, 8 and 9 as being a single piece (e.g., formed of plastic or a light metal material) that is suspended at its top, in some embodiments the screw engagement nut 150 may be made of multiple pieces and/or may be suspended from other locations. In other words, the pivot point 172 need not necessarily be disposed at a top portion of the screw engagement nut 150. It should also be appreciated that, although the screw engagement nut 150 is generally shown as two flat pieces that are joined together at a bent portion 176, no bent portion need necessarily be employed. The bent portion 176 of this example embodiment is provided at least in part to provide room to accommodate a biasing element (e.g., spring 200) of a desired size and construction.

In an example embodiment, a biasing element may be employed to produce a force in a direction shown by arrow 180 to push or urge the screw engagement nut 150 toward the height adjustment screw 136. The force provided by the biasing element may be sufficient to maintain a relatively constant friction and tight fit between the height adjustment screw 136 and the screw engagement nut 150. Accordingly, the teeth 152 of the height adjustment screw 136 may be less likely to damage the threads 160 of the screw engagement nut 150 or to jump out of engagement with the threads 160 of the screw engagement nut 150.

FIG. 9 shows one example embodiment of a biasing element. In this regard, for example, a biasing element in the form of an elastic element (e.g., a spring 200) is provided to push the screw engagement nut 150 in the direction shown by arrow 180. This direction is toward the height adjustment screw 136. The fact that the screw engagement nut 150 is pivotally mounted at its top in this example means that the spring 200 may be compressed in a direction opposite to the direction shown by arrow 180 so that the spring force exerted by the spring 200 is in the direction shown by arrow 180. However, alternative embodiments could be structured differently. For example, instead of having the spring 200 disposed on the same side of the axle 174 as the teeth 152, alternative embodiments could move the axle 174 (and therefore the pivot point 172 for mounting the screw engagement nut 150) lower along the length of the screw engagement nut 150. In such an embodiment, a spring may be positioned above the pivot point and may be biased to exert a force in an opposite direction to that of the arrow 180. Thus, the top part of the screw engagement nut 150 (i.e., the part above the pivot point) may be pulled toward the motor bowl 100 so that the bottom part (i.e., where the teeth 152 are located) is pushed in the direction indicated by arrow 180.

Other biasing elements may be used in some embodiments as well, some of which biasing elements may not necessarily be elastic elements. For example, one or more magnets may be utilized to exert a biasing force in a desired direction to either push (repel) the bottom of the screw engagement nut 150 from the motor bowl 100 or to pull a point above the pivot point toward the motor bowl 100 so that the bottom of the screw engagement nut 150 is pushed toward the height adjustment screw 136 with a force in the direction shown by arrow 180.

Regardless of the specific type or structure of the biasing element, some form of structure that is capable of providing a force to maintain a relatively consistent friction and tightness between the height adjustment screw 136 and the screw engagement nut 150 may be provided according to example embodiments. Accordingly, wear on the surfaces of the height adjustment screw 136 and the screw engagement nut 150 may be reduced and friction and tightness may be relatively constant over time. Slippage or binding of the height adjustment screw 136 and the screw engagement nut 150 relative to one another may therefore be less likely so that a longer operational lifetime for the cutting height adjustment components of the robotic mower 10 may be achieved. Particularly in embodiments in which some or all of the components are molded from plastic or are cast or molded from relatively light metal materials, example embodiments employing the biasing element described herein may experience a relatively lower potential for damage to cutting height adjustment components and relatively little change in tightness between the interfaces provided over time.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A robotic mower comprising:
   a chassis;
   a cutting motor mounted on a motor bracket, the cutting motor driving at least one cutting blade, the motor bracket providing structural support for the cutting motor at an adjustable level relative to the chassis; and
   a height adjustment assembly comprising a biasing element, a screw engagement nut, and a height adjustment screw, the screw engagement nut being operably coupled to the motor bracket to enable adjustment of a height of the motor bracket via rotation of the height adjustment screw, the height adjustment screw rotating to translate the screw engagement nut vertically along the height adjustment screw based on an engagement of teeth on the screw engagement nut with threads of the height adjustment screw, the teeth of the screw engagement nut being urged toward the threads of the height adjustment screw via the biasing element,
   wherein the height adjustment screw is arranged to extend along a first direction to enable adjustment of the height of the motor bracket responsive to translation of the screw engagement nut along the first direction in response to rotation of the height adjustment screw,
   wherein the biasing element is disposed to urge the screw engagement nut in a second direction that is substantially perpendicular to the first direction, and
   wherein the screw engagement nut is suspended from a pivot point disposed at a portion of a nut housing at least partially surrounding the screw engagement nut.

2. The robotic mower of claim 1, wherein the teeth of the screw engagement nut comprise at least one top partial tooth disposed above, and at least one bottom partial tooth disposed below, a tooth that is wider than the top partial tooth and the bottom partial tooth.

3. The robotic mower of claim 2, wherein the height adjustment screw comprises a top stop disposed at one end of a threaded portion of the height adjustment screw and a bottom stop disposed at the other end of the threaded portion, the top and bottom stops extending along a direction substantially parallel to an axis of the height adjustment screw.

4. The robotic mower of claim 3, wherein a range of motion of the screw engagement nut is defined between a first cutting height at which the top partial tooth engages the top stop and a second cutting height at which the bottom partial tooth engages the bottom stop.

5. The robotic mower of claim 1, wherein the screw engagement nut includes at least two portions that each extend substantially along the first direction parallel to an axis of the height adjustment screw, and wherein one of the at least two portions lies in a plane that is substantially parallel to and closer to the axis of the height adjustment screw than the other of the at least to portions in order to define a space between the motor bracket and the one of the at least two portions to house the biasing element.

6. The robotic mower of claim 1, wherein the biasing element comprises an elastic element disposed to urge the screw engagement nut in the second direction.

7. The robotic mower of claim 1, wherein the biasing element comprises a spring disposed to urge the screw engagement nut away from the motor bracket and toward the height adjustment screw.

8. A height adjustment assembly for a robotic mower comprising a chassis, a cutting motor mounted on a motor bracket, the cutting motor driving at least one cutting blade, the motor bracket providing structural support for the cutting motor at an adjustable level relative to the chassis, the height adjustment assembly comprising:
 a biasing element;
 a screw engagement nut; and
 a height adjustment screw,
 wherein the screw engagement nut is operably coupled to the motor bracket to enable adjustment of a height of the motor bracket via rotation of the height adjustment screw, the height adjustment screw rotates to translate the screw engagement nut vertically along the height adjustment screw based on an engagement of teeth on the screw engagement nut with threads of the height adjustment screw, and the teeth of the screw engagement nut are urged toward the threads of the height adjustment screw via the biasing element,
 wherein the height adjustment screw is arranged to extend along a first direction to enable adjustment of the height of the motor bracket responsive to translation of the screw engagement nut along the first direction in response to rotation of the height adjustment screw,
 wherein the biasing element is disposed to urge the screw engagement nut in a second direction that is substantially perpendicular to the first direction, and
 wherein the screw engagement nut is suspended from a pivot point disposed at a portion of a nut housing at least partially surrounding the screw engagement nut.

9. The height adjustment assembly of claim 8, wherein the teeth of the screw engagement nut comprise at least one top partial tooth disposed above, and at least one bottom partial tooth disposed below, a tooth that is wider than the top partial tooth and the bottom partial tooth.

10. The height adjustment assembly of claim 9, wherein the height adjustment screw comprises a top stop disposed at one end of a threaded portion of the height adjustment screw and a bottom stop disposed at the other end of the threaded portion, the top and bottom stops extending along a direction substantially parallel to an axis of the height adjustment screw.

11. The height adjustment assembly of claim 10, wherein a range of motion of the screw engagement nut is defined between a first cutting height at which the top partial tooth engages the top stop and a second cutting height at which the bottom partial tooth engages the bottom stop.

12. The height adjustment assembly of claim 8, wherein the screw engagement nut includes at least two portions that each extend substantially along the first direction parallel to an axis of the height adjustment screw, and wherein one of the at least two portions lies in a plane that is substantially parallel to and closer to the axis of the height adjustment screw than the other of the at least to portions in order to define a space between the motor bracket and the one of the at least two portions to house the biasing element.

13. The height adjustment assembly of claim 8, wherein the biasing element comprises an elastic element disposed to urge the screw engagement nut in the second direction.

14. The height adjustment assembly of claim 8, wherein the biasing element comprises a spring disposed to urge the screw engagement nut away from the motor bracket and toward the height adjustment screw.

15. A height adjustment assembly for a robotic mower comprising a chassis, a cutting motor mounted on a motor bracket, the cutting motor driving at least one cutting blade, the motor bracket providing structural support for the cutting motor at an adjustable level relative to the chassis, the height adjustment assembly comprising:
 a biasing element;
 a screw engagement nut; and
 a height adjustment screw,
 wherein the screw engagement nut is operably coupled to the motor bracket to enable adjustment of a height of the motor bracket via rotation of the height adjustment screw, the height adjustment screw rotates to translate the screw engagement nut vertically along the height adjustment screw based on an engagement of teeth on the screw engagement nut with threads of the height adjustment screw, and the teeth of the screw engagement nut are urged toward the threads of the height adjustment screw via the biasing element,
 wherein the height adjustment screw is arranged to extend along a first direction to enable adjustment of the height of the motor bracket responsive to translation of the screw engagement nut along the first direction in response to rotation of the height adjustment screw,
 wherein the biasing element is disposed to urge the screw engagement nut in a second direction that is substantially perpendicular to the first direction, and
 wherein the teeth of the screw engagement nut comprise at least one top partial tooth disposed above, and at least one bottom partial tooth disposed below, a tooth that is wider than the top partial tooth and the bottom partial tooth.

16. The height adjustment assembly of claim 15, wherein the height adjustment screw comprises a top stop disposed at one end of a threaded portion of the height adjustment screw and a bottom stop disposed at the other end of the threaded portion, the top and bottom stops extending along a direction substantially parallel to an axis of the height adjustment screw.

17. The height adjustment assembly of claim 16, wherein a range of motion of the screw engagement nut is defined between a first cutting height at which the top partial tooth engages the top stop and a second cutting height at which the bottom partial tooth engages the bottom stop.

18. The height adjustment assembly of claim 15, wherein the screw engagement nut includes at least two portions that each extend substantially along the first direction parallel to an axis of the height adjustment screw, and wherein one of the at least two portions lies in a plane that is substantially parallel to and closer to the axis of the height adjustment screw than the other of the at least to portions in order to define a space between the motor bracket and the one of the at least two portions to house the biasing element.

19. The height adjustment assembly of claim 15, wherein the biasing element comprises an elastic element disposed to urge the screw engagement nut in the second direction.

20. The height adjustment assembly of claim 15, wherein the biasing element comprises a spring disposed to urge the screw engagement nut away from the motor bracket and toward the height adjustment screw.

* * * * *